Dec. 18, 1928.　　　　　　　　　　　　　　　　　　　1,695,603
F. MAGIDSON
MACHINE FOR MANUFACTURING WIRE GARMENT HANGERS
Filed Aug. 5, 1926　　　11 Sheets-Sheet 3
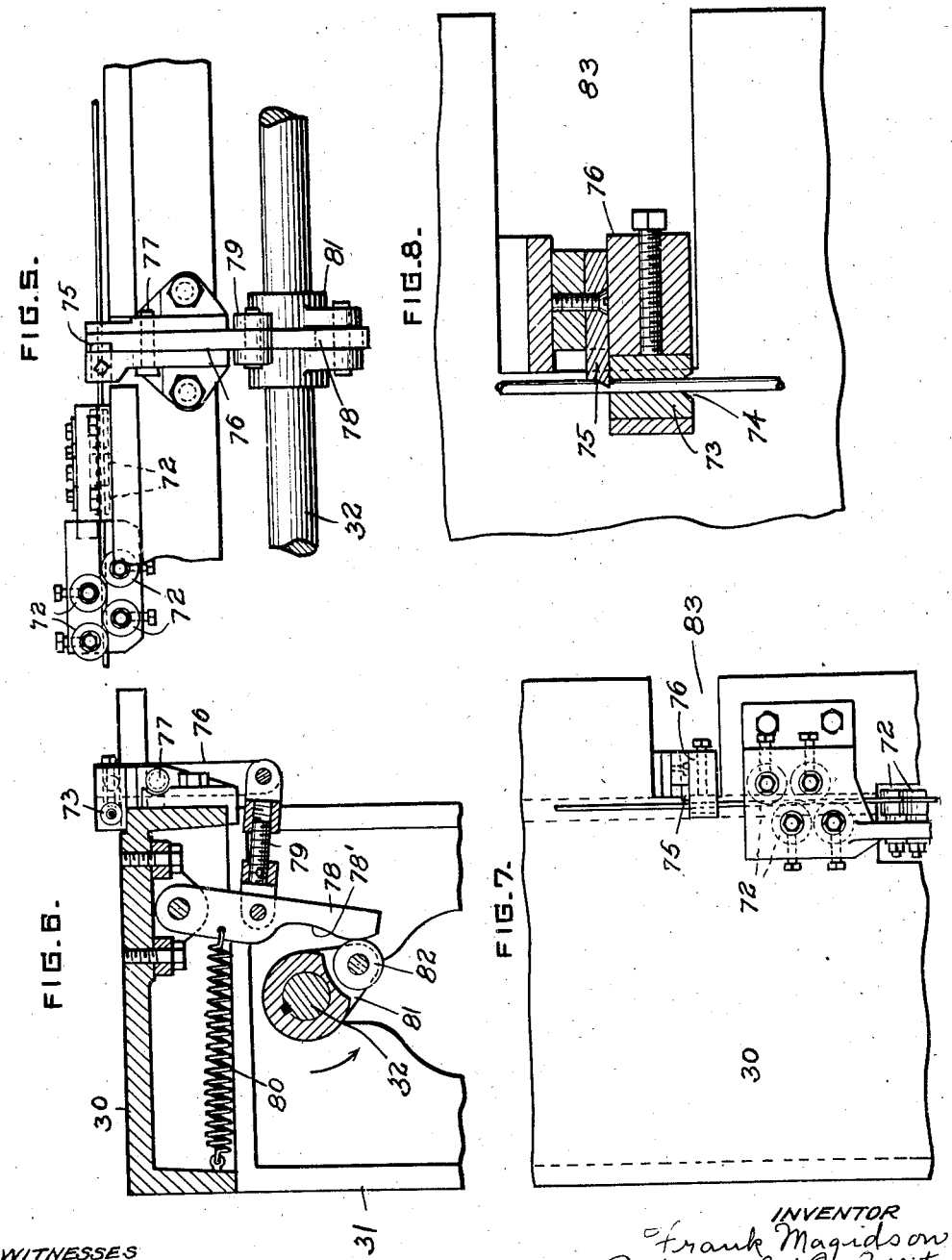
WITNESSES
J. Hebel Bradley
INVENTOR
Frank Magidson
By Green and McCallister
His Attorneys

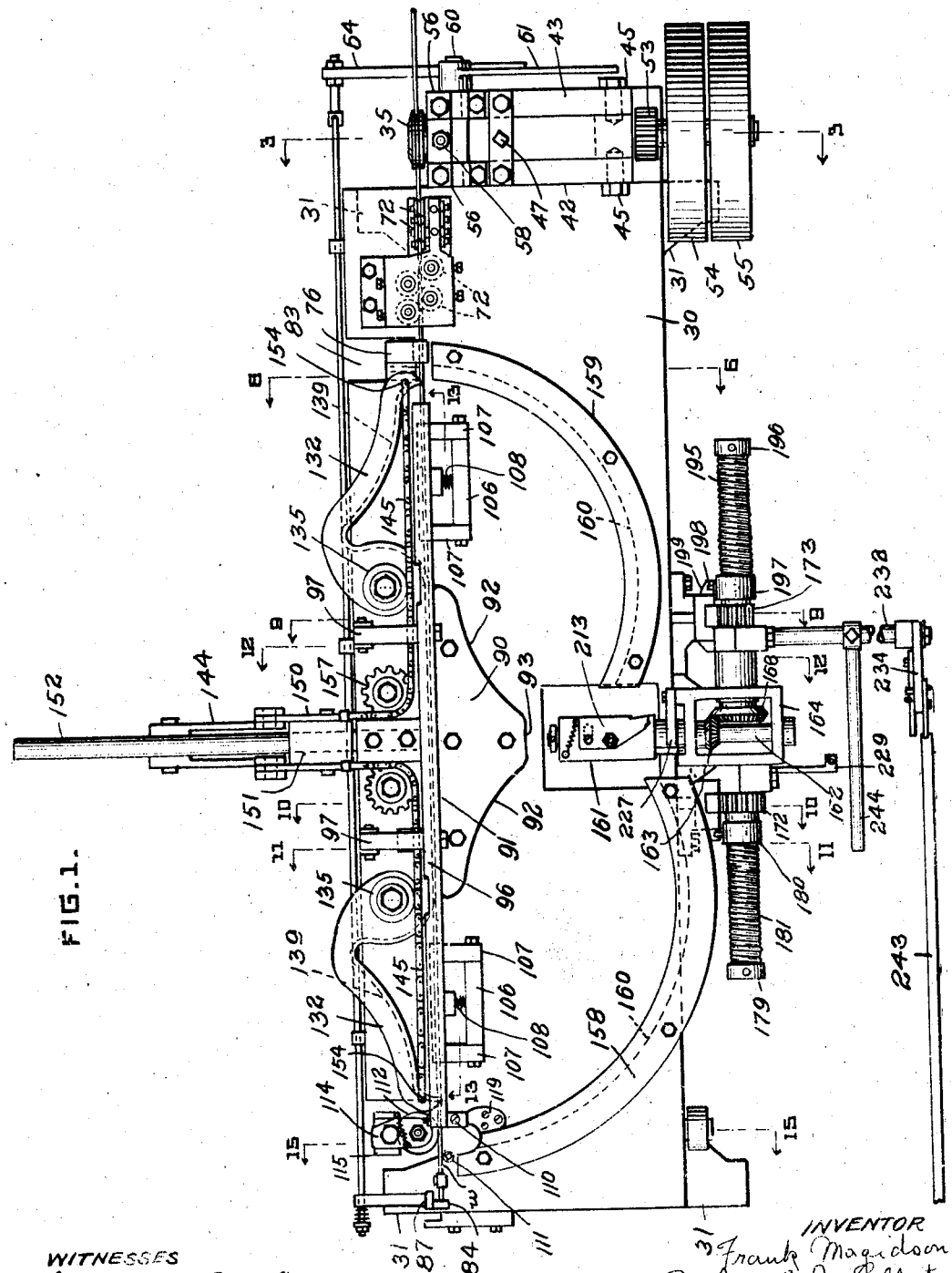

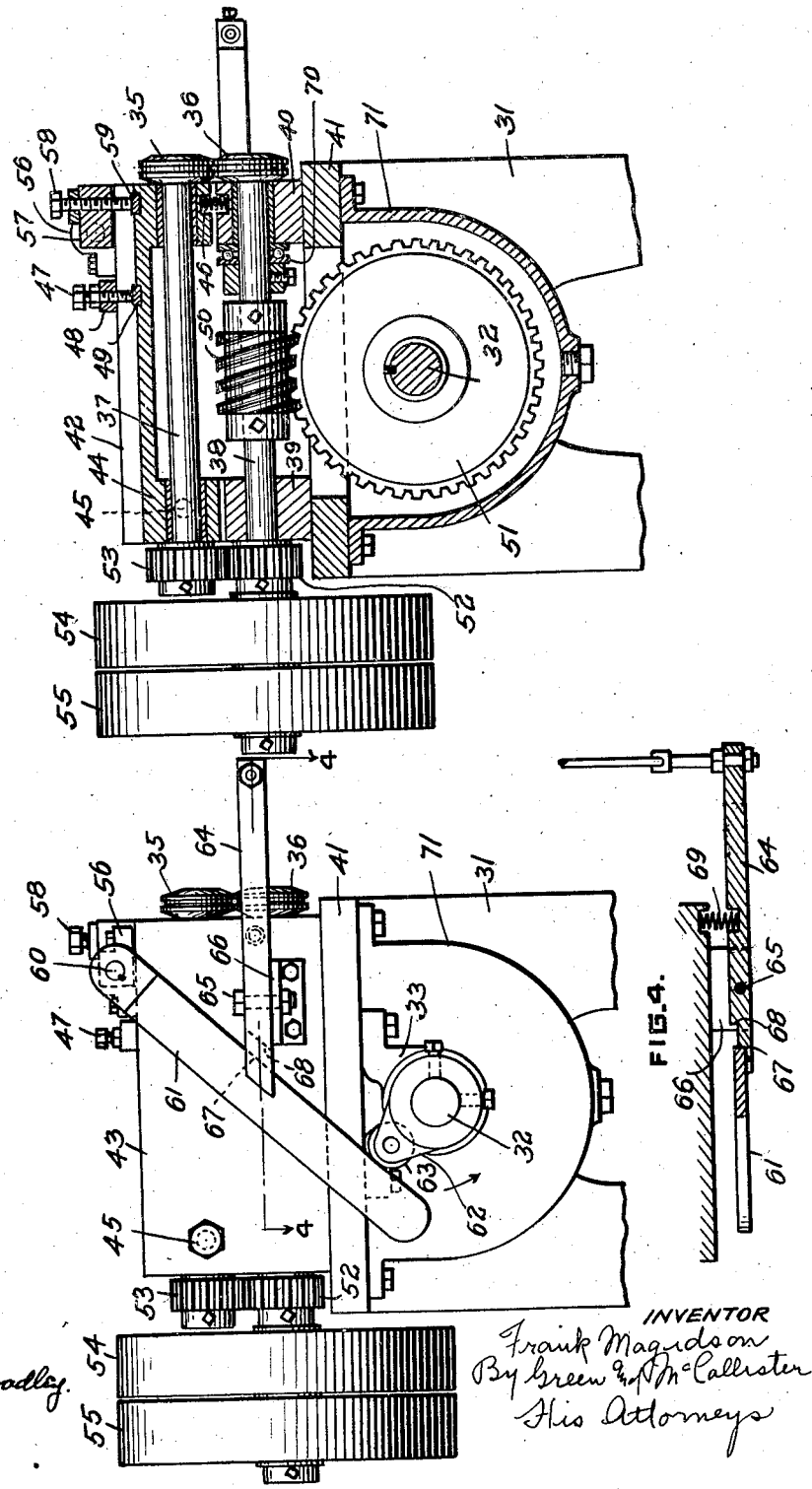

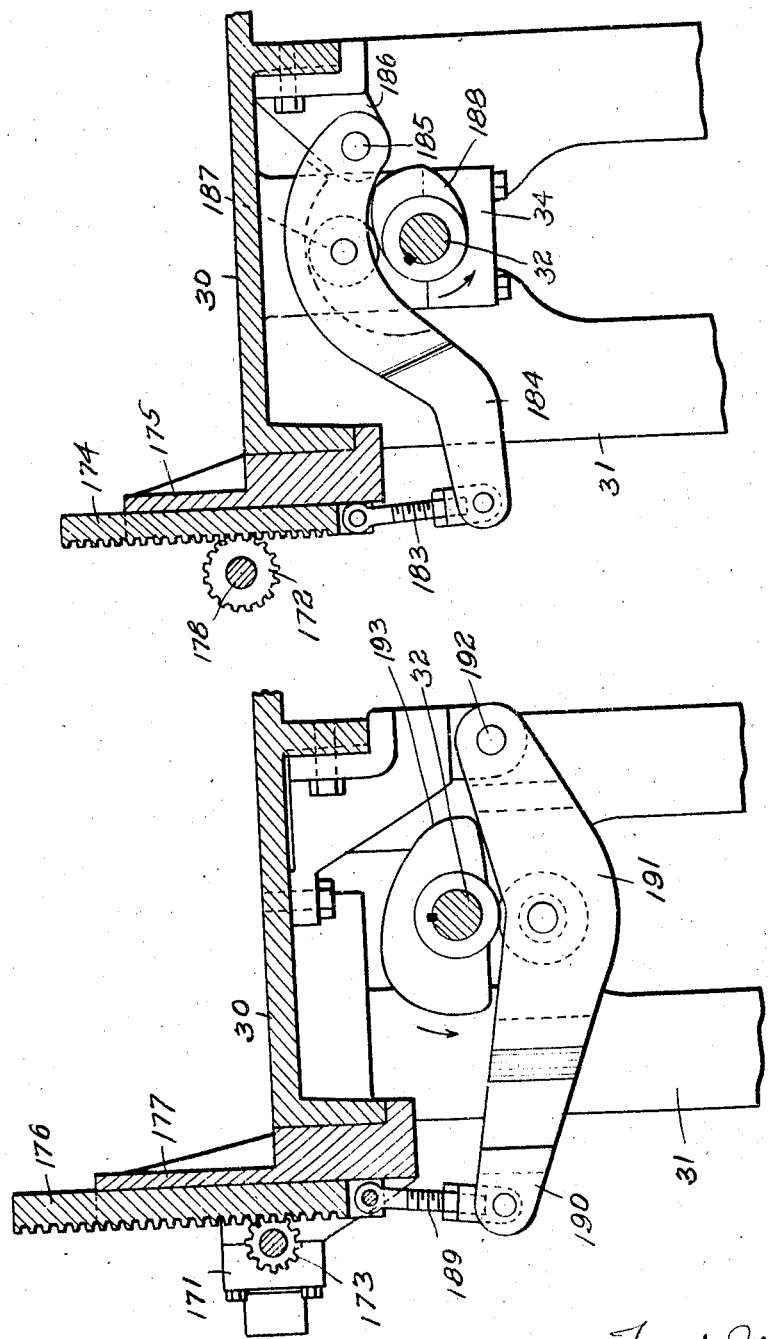

Dec. 18, 1928.                                                    1,695,603
F. MAGIDSON
MACHINE FOR MANUFACTURING WIRE GARMENT HANGERS
Filed Aug. 5, 1926                      11 Sheets-Sheet 5
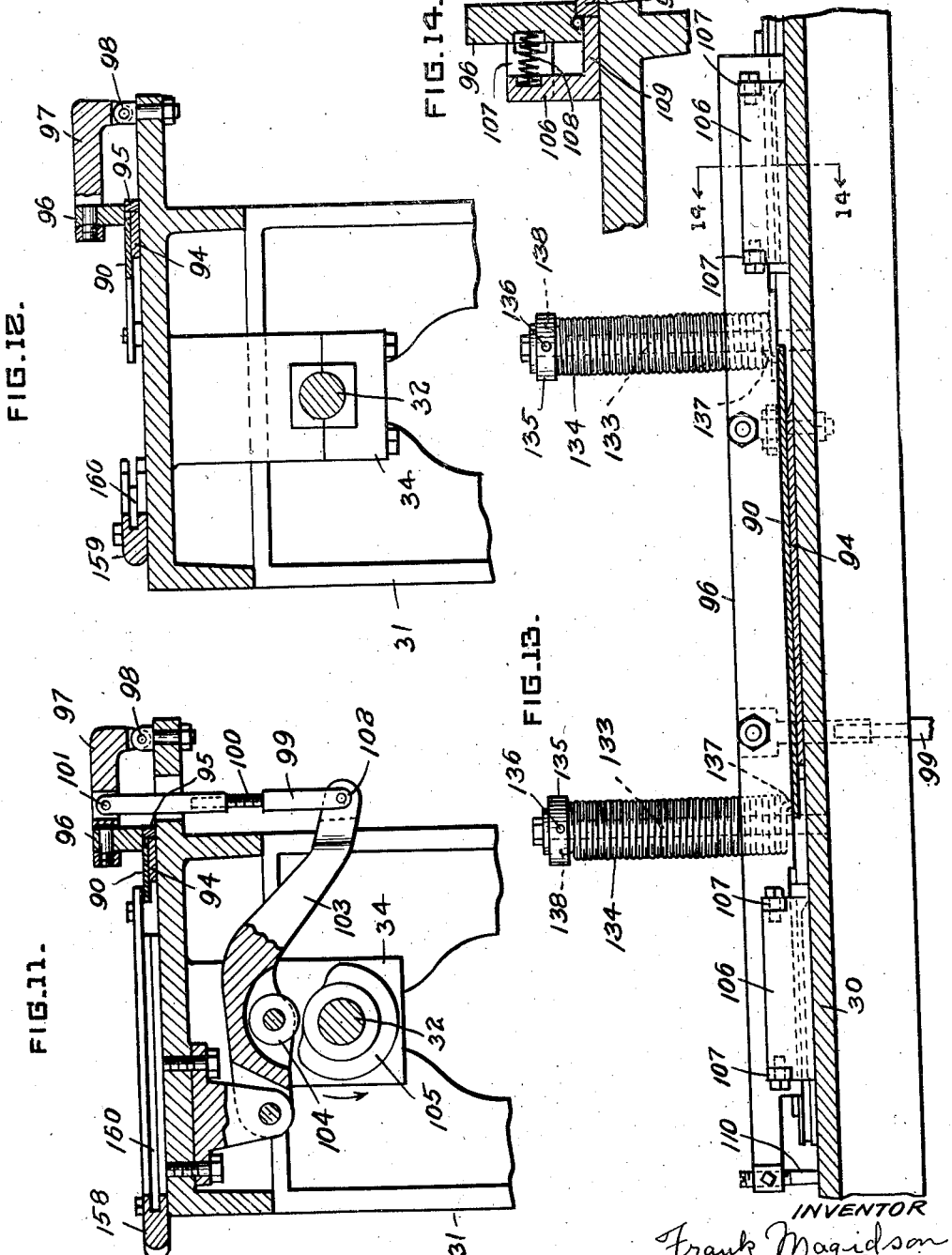
WITNESSES
J. Herbert Bradley
INVENTOR
Frank Magidson
By Green and McAllister
His Attorneys Dec. 18, 1928.  
F. MAGIDSON  
1,695,603  
MACHINE FOR MANUFACTURING WIRE GARMENT HANGERS  
Filed Aug. 5, 1926    11 Sheets-Sheet 6

WITNESSES  
J. Hebel Bradley

INVENTOR  
Frank Magidson  
By Green & McCalister  
His Attorneys

Dec. 18, 1928.　　　　　　　　　　　　　　　　　　　1,695,603
F. MAGIDSON
MACHINE FOR MANUFACTURING WIRE GARMENT HANGERS
Filed Aug. 5, 1926　　　　11 Sheets-Sheet 7

WITNESSES
J. Herbert Bradley.

INVENTOR
Frank Magidson
By Green and McCallister
His Attorneys

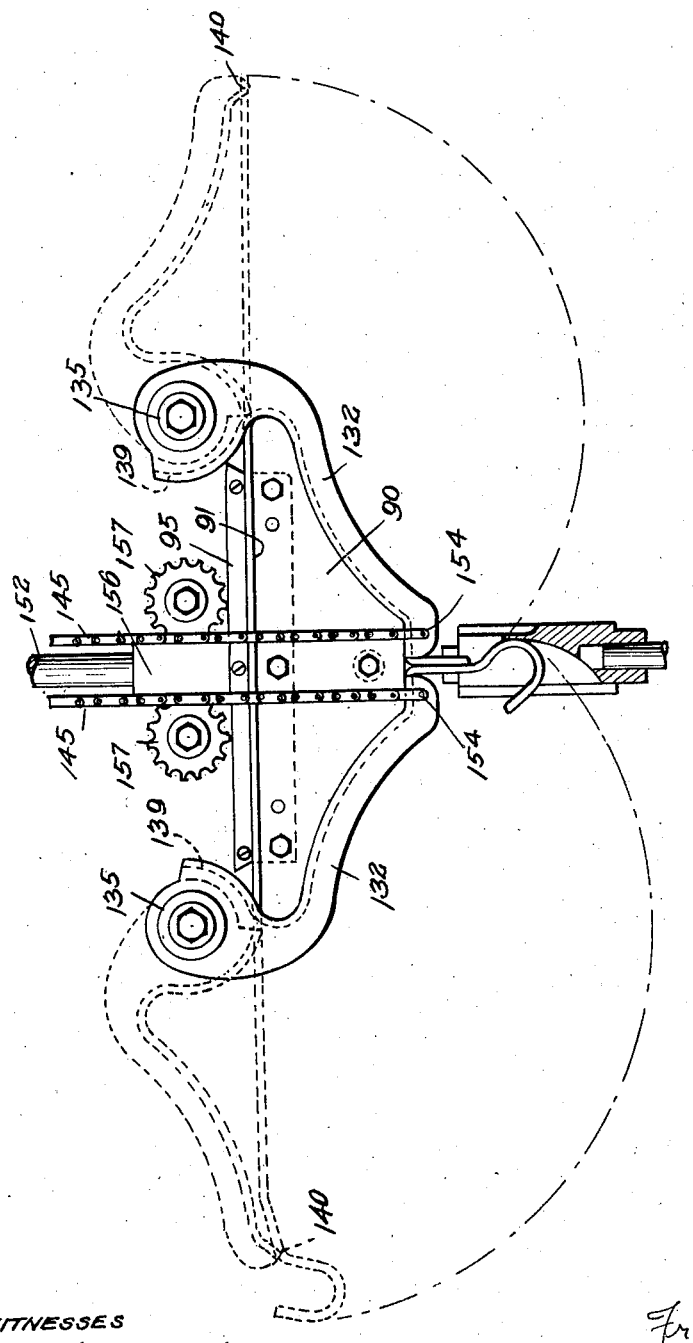

Dec. 18, 1928.
F. MAGIDSON
1,695,603
MACHINE FOR MANUFACTURING WIRE GARMENT HANGERS
Filed Aug. 5, 1926 11 Sheets-Sheet 9
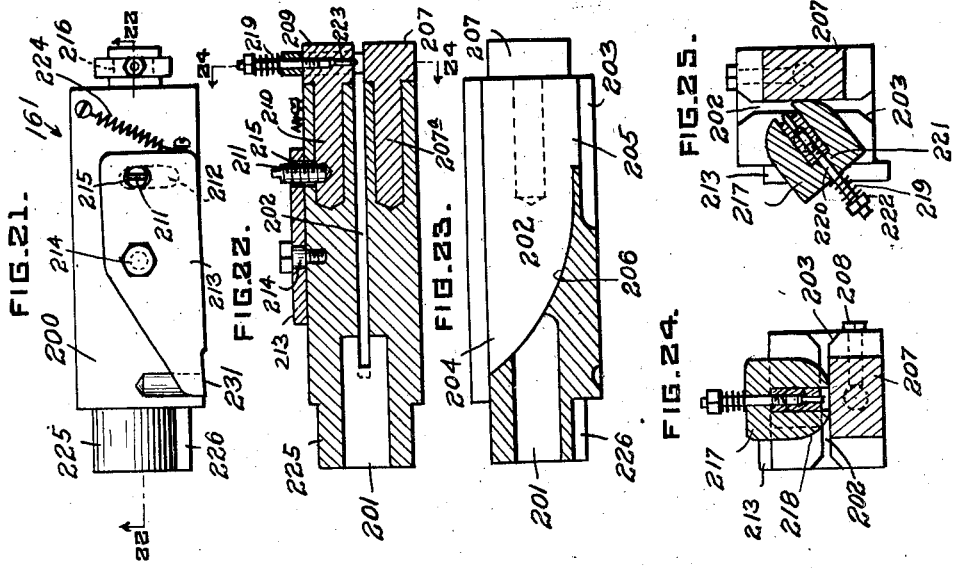
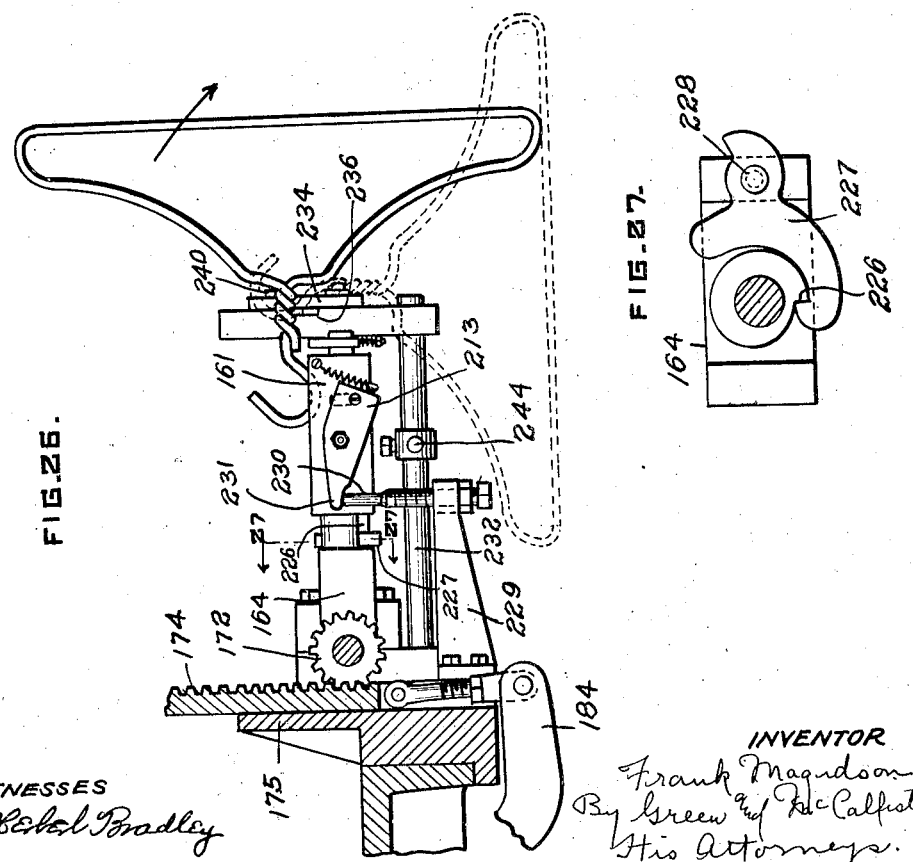

Dec. 18, 1928. 1,695,603
F. MAGIDSON
MACHINE FOR MANUFACTURING WIRE GARMENT HANGERS
Filed Aug. 5, 1926 11 Sheets-Sheet 10

INVENTOR
Frank Magidson
By Green and McAllister
His Attorneys.

WITNESSES
J. Herbert Bradley

Dec. 18, 1928.  
F. MAGIDSON  
1,695,603  
MACHINE FOR MANUFACTURING WIRE GARMENT HANGERS  
Filed Aug. 5, 1926    11 Sheets-Sheet 11
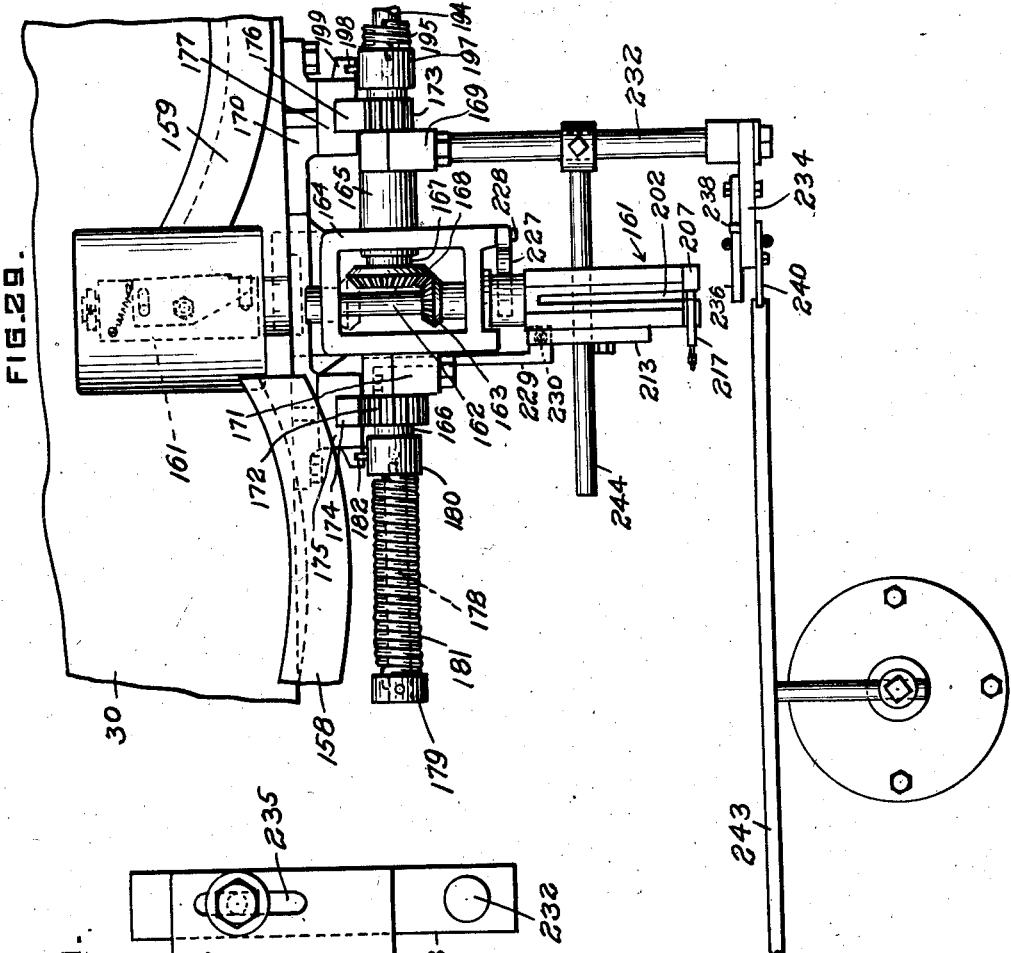
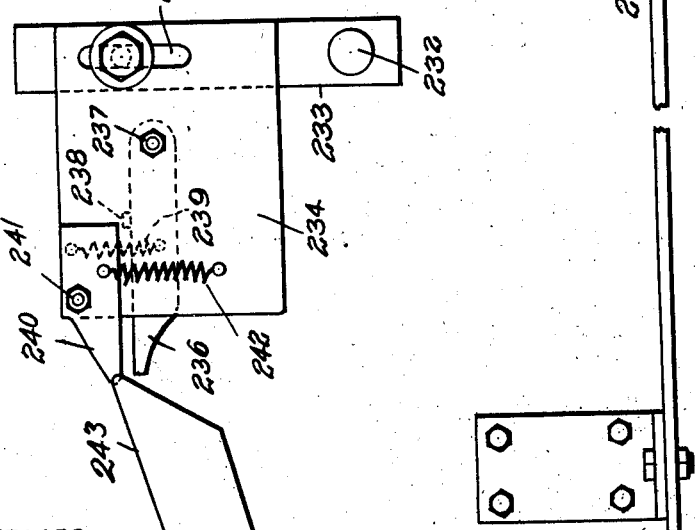
INVENTOR  
Frank Magidson  
By Green & McCallister  
His Attorneys.
WITNESSES  
J. Halet Bradley.

Patented Dec. 18, 1928.

1,695,603

UNITED STATES PATENT OFFICE.

FRANK MAGIDSON, OF PITTSBURGH, PENNSYLVANIA, ASSIGNOR, BY DIRECT AND MESNE ASSIGNMENTS, TO STAR SERVICE HANGER COMPANY, OF DETROIT, MICHIGAN, A CORPORATION OF MICHIGAN.

MACHINE FOR MANUFACTURING WIRE GARMENT HANGERS.

Application filed August 5, 1926. Serial No. 127,317.

This invention relates to wire working machines and more particularly to machines for manufacturing wire coat or garment hangers.

Wire coat hangers (coat and garment hangers) of the type here contemplated are now largely used by garment cleaners and pressers, and are a well known and staple article. It is now customary for cleaners and pressers to deliver garments on such hangers and to supply the hangers without cost. The hangers, therefore, must be comparatively cheap and one object of this invention is to produce a machine or apparatus by means of which such hangers may be made in relatively large quantities and at a relatively low cost.

Another object of this invention is to produce a machine or apparatus for manufacturing such hangers which is simple in construction, relatively cheap to manufacture, which requires but relatively small floor space, and which is entirely automatic in its operation.

A further object of this invention is to produce a machine or apparatus into which the wire is fed from a reel, is straightened, cut to length, has one end thereof bent to form a hook, is next bent to form the body of the hanger, has the ends twisted one about the other and is discharged from the machine.

These, as well as other objects, which will be apparent to those skilled in this particular art, I attain by means of the machine or apparatus described in the specification and illustrated in the drawings accompanying and forming part of this application.

Instead of supplying the machine with wire that has been straightened and cut to length as is now done in some types of machines used for manufacturing garment hangers, the wire in this machine is fed from a reel and the machine itself straightens and cuts the wire to length. The reel is preferably provided with a vertical axis and is adapted to carry a coil of wire in such position as to be easily led to the feed rolls of the machine.

The entire formation of the hanger takes place in one plane and in the machine chosen for illustration, this plane is horizontal. It will be apparent, however, after the construction and operation of the machine is understood, that this could as well be a vertical plane.

In the drawings, Figure 1 is a top plan view of a machine or apparatus embodying this invention.

Fig. 2 is a view in end elevation of the feed end of the machine and shows the wire feeding rolls and the mechanism for causing said rolls to be intermittently moved into and out of operative position.

Fig. 3 is a view in sectional elevation taken on line 3—3 of Fig. 1 and shows the wire feed rolls and the driving means for the same and illustrates the main cam shaft of the machine and the worm drive for said shaft.

Fig. 4 is a detail sectional view taken on line 4—4 of Fig. 2 looking downwardly.

Fig. 5 is a detail view in elevation and illustrates the wire straightening rolls and the wire cutter.

Fig. 6 is a fragmentary view in elevation taken on line 6—6 of Fig. 1 and shows the wire cutter and the cutter operating mechanism.

Fig. 7 is a detail plan view and illustrates the wire straightener rolls and the wire cutter.

Fig. 8 is a detail sectional view of the wire cutter and is taken on a horizontal plane which includes the axis of the wire passing through the cutter.

Figs. 9 and 10 are detail views partially in elevation and partially in section and are respectively taken on lines 9—9 and 10—10 of Fig. 1.

Fig. 9 shows the mechanism for operating the twister head and Fig. 10 shows the mechanism for swinging the twister head into and out of operative position.

Figs. 11, 12 and 13 are detail sectional views taken on lines 11—11, 12—12 and 13—13 respectively, of Fig. 1 and show the wire guiding means and the operating mechanisms therefor.

Fig. 14 is a detail sectional view of a portion of the wire guiding means and is taken on line 14—14 of Fig. 12.

Figure 15:
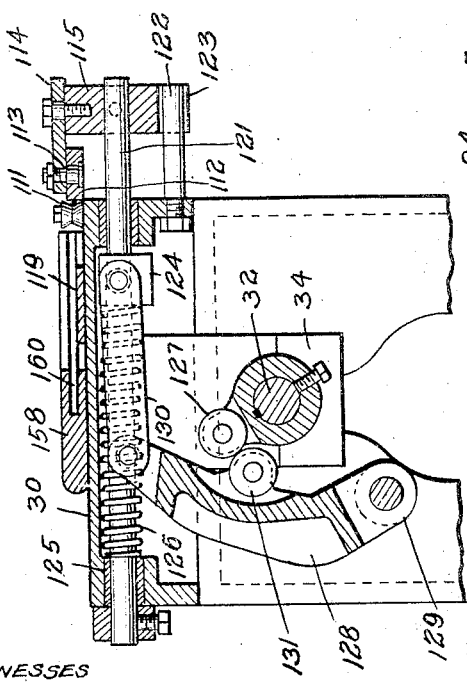

Fig. 15 is a sectional view taken on line 15—15 of Fig. 1 and shows the operating mechanism for the hook forming device.

Figure 16:
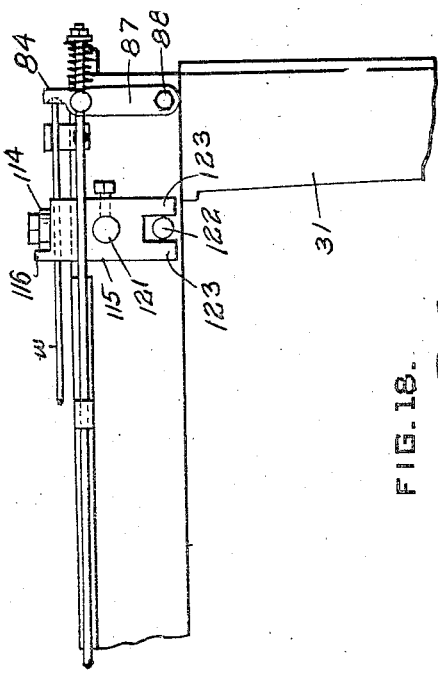

Fig. 16 is a detail view in elevation of a portion of the machine and shows a part of the hook forming device and the stop and trip operating mechanism for causing the feed rolls to move to inoperative position.

Figure 17:
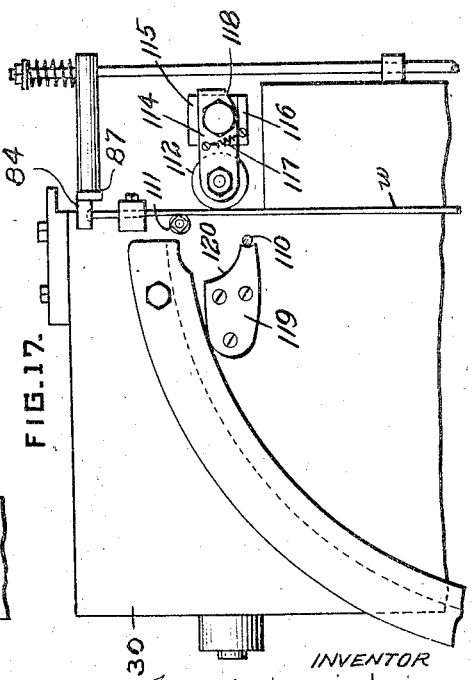

Fig. 17 is a top plan view of the hook forming device and the trip mechanism shown in Fig. 16.

Figure 18:
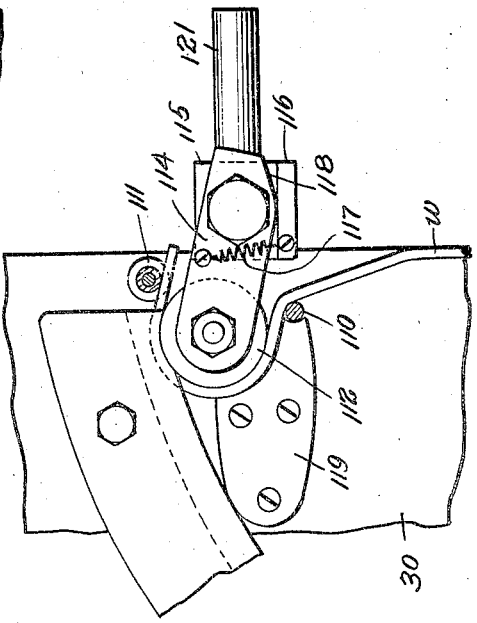

Fig. 18 is an enlarged detail view of the hook forming device.

Figure 19:
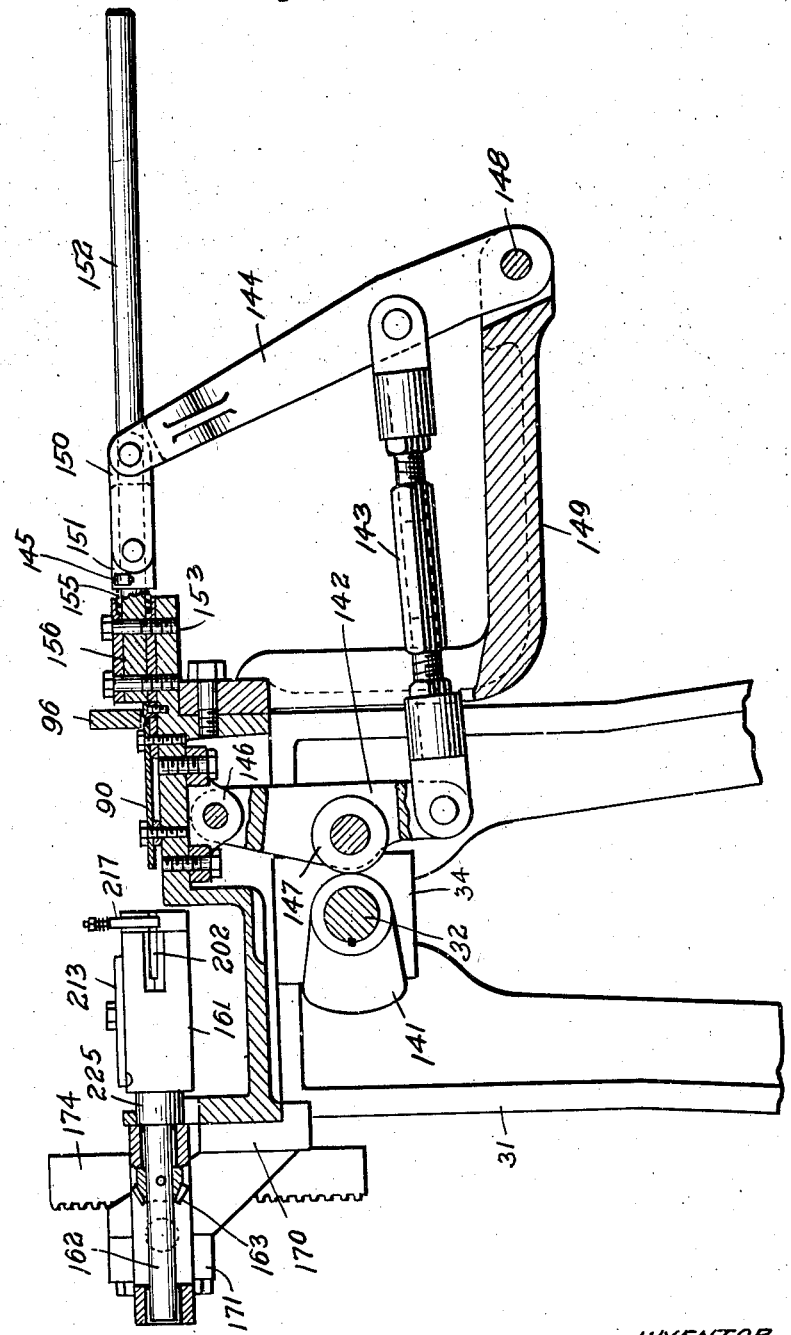

Fig. 19 is a view partly in section and partly in elevation taken through the center of the machine. This view shows the mechanism for operating the forming arms.

Fig. 20 is an enlarged detail view in top plan of the forming arms and the stationary former block. In this view, the twister head is shown in horizontal section. The forming arms and the wire jaws prior to operation of the forming arms are shown by dotted lines.

Fig. 21 is a top plan view of the twister head when in operative position to receive the ends of the wire.

Fig. 22 is a view in sectional elevation of the twister head and is taken on line 22—22 of Fig. 21.

Fig. 23 is a sectional view taken through the center of the twister head looking downwardly when the same is in the position shown in Fig. 21.

Fig. 24 is an end sectional view taken on line 24—24 of Fig. 22. This view shows the device for locking the wires in the twister head when in operative position.

Fig. 25 is a view similar to Fig. 24, but shows the twister head turned 90° and in this view the locking device is shown unlocked or in releasing position.

Fig. 26 is a detail view partially in section and partially in elevation and shows the twister head in discharging position.

Fig. 27 is a sectional view taken on line 27—27 of Fig. 26 and shows means for locking the twister head against rotation during the discharging operation.

Figure 28:
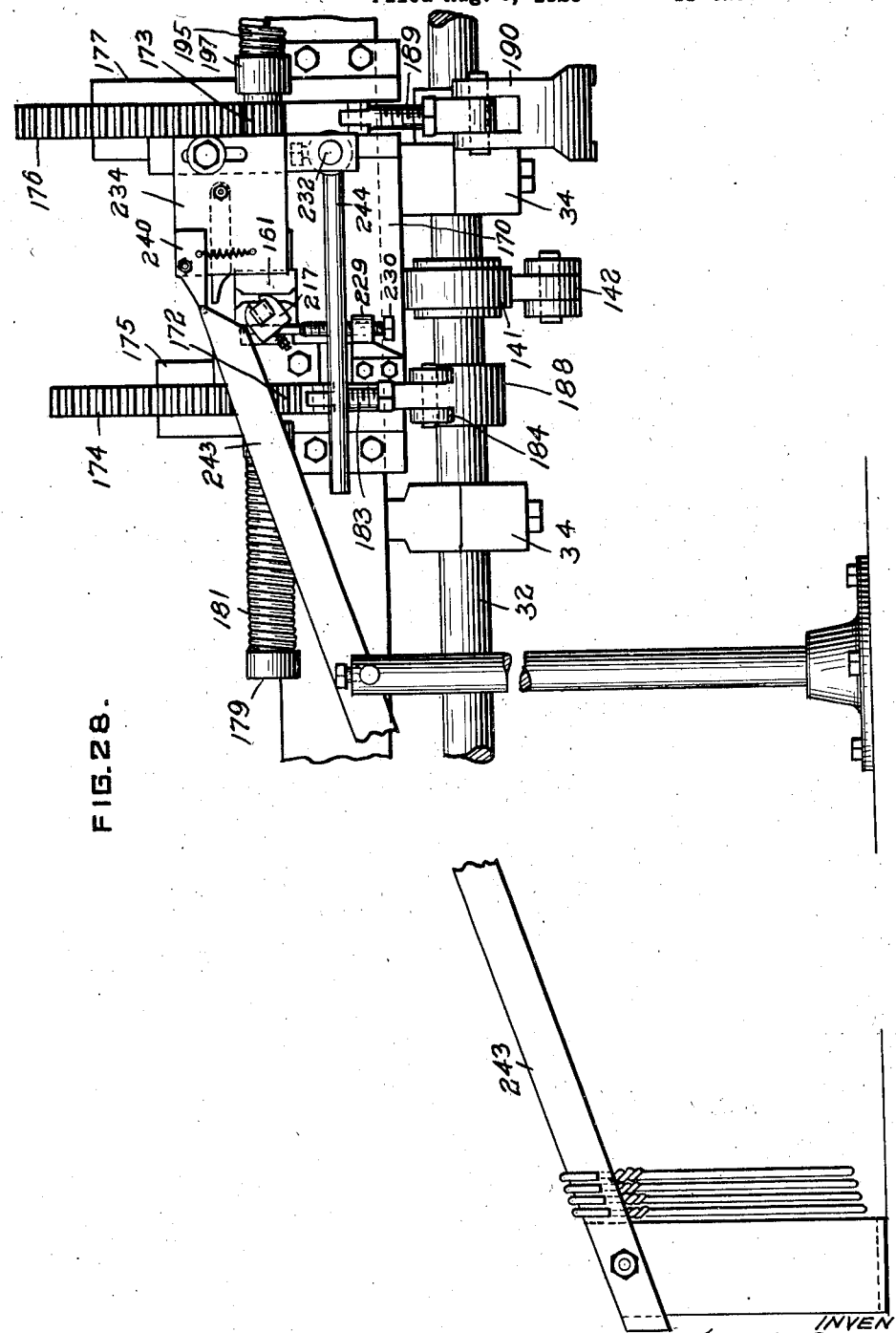

Fig. 28 is a detail view in elevation of a portion of the front of the machine and illustrates the hanger discharge mechanism and the hanger collecting device.

Fig. 29 is a top plan view of the elements shown in Fig. 28 and Fig. 30 is an enlarged detail view of the mechanism for receiving the hangers from the machine and for feeding the same to the collecting device.

In a general way, the machine consists of feed rolls which pull the wire from the reel and force or push it into position in the machine. After leaving the feed rolls, the wire is forced through straightening rolls, thence past a cutter and through a guideway to the far end of the machine where it strikes against a tripping mechanism which, operating in conjunction with the cam for controlling the operation of the feed rolls, times the separation of the feed rolls.

The feed rolls are continuously driven and while held in inoperative position by means of a spring, are periodically closed so that the wire feed is intermittent, but regularly timed to co-ordinate with the other mechanisms.

The wire in its passage through or into the machine moves past a stationary former plate and when the wire is brought to rest in the machine and is severed, it projects a greater distance on one side of the stationary former plate than on the other. As soon as the wire comes to rest in the machine, the hook is formed in the long end of the wire and the other end of the wire is severed. The ends of the wire are then bent around the former plate by means of swinging arms. The active faces of these arms are channeled and made to conform to the contour of the former plate which they overlap.

The swinging arms force the ends of the wire (one with the hook and one plain) between rigid jaws in the twister head. The two ends of the wire are automatically locked within the twister head and while the wire is held in position by the swinging arms in contact with the former plate, the twist is made and the ends thereby locked together. The swinging arms are then returned to initial position and the twister head is moved to a position to discharge the finished hanger. The twister head is then moved back to receiving position and while this is taking place, another length of wire is forced into position in the machine.

*The machine in detail.*

The machine is provided with a horizontal bed or table 30 supported by suitable standards or legs 31. The wire guides, the stationary former plate, the forming arms, the hook former and the twister are all located above the bed 30 and operate in the plane of the wire in its passage into position in the machine.

The cams for operating the different parts of the machine in timed relation one to the other are mounted on a main shaft 32 of the machine and this main shaft is journaled in suitable bearings in hangers such as 33, Figs. 2 and 34, (Figs. 11, 12, 15 and 19,) depending from the under side of the bed.

*The wire feeding mechanism.*

The feed or pinch rolls 35 and 36 are respectively mounted at the outer ends of shafts 37 and 38. Shaft 38 is journaled in fixed bearing blocks 39 and 40 which are secured to and supported upon a shelf 41 formed on standards 31. The shelf is located below the level of the bed 30. Bearing blocks 39 and 40 are located between two vertically extending and spaced side plates 42 and 43 which are secured to shelf 41. Shaft 37 for the upper pinch roll 35 is journaled within a U-shaped frame member 44 which slidingly fits between side plates 42 and 43 and the frame is mounted for pivotal movement on pivot studs 45 which are threaded through the side plates. The free end of frame 44 adjacent roller 35 is normally lifted away from the top of bearing block 44 by means of a stiff coil spring 46 which is located in aligned recesses in the bottom of bearing frame 44 and the top of bearing block 40. The upward movement of U-shaped frame 44 about pivot studs 45 is limited by means of an adjustment screw 47 which is threaded through a bar 48 which in turn is secured to side plates 42 and 43. The inner end of adjustment screw 47 is adapted to bear against a hardened abutment member 49 secured in place in the top of U-shaped frame 44 in line with the adjustment screw.

The rolls 35 and 36 are grooved as shown in Figs. 2 and 3 so as to pinch or grip the wire forced thereby into position in the machine.

Shaft 38 carries a worm wheel 50 which meshes with a worm wheel 51 keyed to main cam shaft 32. Shaft 38 carries a gear 52 that meshes with a gear 53 carried by shaft 37. Shaft 38 is also provided with a driving pulley 54 and a loose pulley 55.

Bolted to the tops of side plates 42 and 43 are bearing blocks 56—56 and journaled within these is an actuator member 57. The forward end of this member is drilled and tapped to receive an adjustment screw 58 and the lower end of this screw bears against a hardened abutment member 59 which is let into a hole drilled for that purpose in the top of U-shaped frame 44. Actuator member 57 which is provided with trunnions upon which the same is pivotally swung, has one of these trunnions 60 extended beyond its bearing block and keyed to this extension is an operating level 61.

A cam 62 provided with a cam roller 63 is mounted on main shaft 32 in line with lever 61. The cam rotates in the direction of the arrow and raises lever 61 intermittently and thereby depresses pinch roll 35 through the agency of screw 58 which is carried by the actuator 57 to one trunnion of which lever 61 is secured.

Lever 64 mounted on a vertical pivot pin 65 secured to a supporting pad 66 has its inner end stepped as shown at 67. This stepped end is urged toward the machine and into the path of lever 61 by means of a coil spring 69 which is positioned between the outer end of the lever and the end of the machine. From this construction, it will be seen that as lever 61 is raised by cam 62, stop 67 will move into the path of lever 61 and will retain the lever in raised position when cam lever 63 is moved out of contact with the lever 61. A tripping mechanism to be hereinafter described, is utilized for timing the release of lever 61 and therefore the separation of pinch rolls 35 and 36 and consequently the feed of the wire.

A thrust bearing 70 is provided in order to take care of the end thrust of worm 50 and a housing 71 for worm wheel 51 is provided and is adapted to be filled with lubricant for the worm 50 and the worm wheel 51.

*The wire straightening mechanism.*

The wire for supplying the machines is obtained in standard coils and the coils are supported upon a reel having a vertical axis. The wire as it emerges from the pinch rolls 35 and 36 passes through a series of straightening rolls 72. Part of the series of straightening rolls have vertical axes and part have horizontal axes. The straightening rolls are arranged thus in order that the wire as it emerges therefrom will be straight.

The wire upon emerging from the straightening rolls is forced through a drilled cutter block 73 which is preferably hardened and provided with a bell mouth 74. A cutter bar 75 secured to the upper end of a lever arm 76 is periodically moved across the cutter block 73 to sever the wire into suitable lengths for forming the hangers. Lever 76 is pivotally mounted at 77 and has its lower end connected by means of an adjustable link 79 to a swinging lever arm 78 provided with a cam surface 78'. A tension spring 80 secured to swinging lever 78 yieldingly holds cutter bar 75 in inoperative position so as to clear the opening through cutter block 73. A cam roller 82 is mounted in the end of a supporting arm 81 keyed to main shaft 32 and rotated in the direction of the arrow. It is apparent that this mechanism will periodically move the cutter bar 75 across the path of the wire extending through cutter block 73 and thus sever the same.

The wire, upon emerging from the cutter block 73 enters a wire guiding device which guides it in a straight line to the far end of the machine where it contacts with a trigger block 84.

The bed or table 30 is cut away at 83 to receive lever 76 and the cutter bar and supports attached thereto.

*The wire guiding device.*

Before describing the wire guiding device, it is well to understand that the stationary former plate which is numbered 90 is located midway between the cutter block 73 and the trigger member 84, the distance that it is off center corresponds to the length of the wire utilized in forming the hook.

The back edge 91 of the former plate is straight from end to end while the sides 92 and the top edge 93 are so shaped as to give the proper contour to the finished hanger. The former plate 90 is supported a slight distance above the bed plate by a spacer plate 94. The spacer plate at its back edge is straight from end to end and projects rearwardly beyond the back edge of the former plate a distance slightly in excess of the diameter of the wire. A back bar 95 is secured to the bed 30 and abuts against the back edge of the spacer plate 94 thus forming a wire channel between the back of the former plate and the back bar 95. This back bar extends the length of the former plate. A guide bar 96 that normally rests on the top of back bar 95 covers the wire channel provided between this bar and the back of the former plate and the guide bar is provided with two rearwardly extending L-shaped arms 97 the lower ends of which are hinged at 98 to bracket members secured to the bed plate.

A link 99 the length of which is adjustable by means of a screw 100, is connected at 101 to one of the L-shaped arms 97 and at 102 to the free end of a cam lever 103. Lever 103 carries a contact roller 104 and main shaft 32 carries a cam 105 for periodically raising the bar 96 to inoperative position. The bar is moved by gravity to operative position.

Bar 96 adjacent its opposite ends is provided with two pivotally mounted L-shaped guiding members 106. Each of these members is pivotally connected between a pair of arms 107 which arms are spaced apart and project forwardly from the bar 96. Each of these L-shaped bars is yieldingly urged into operative position by means of a coil spring 108 (Figs. 1 and 14). When bar 96 is in operative position, the lower legs 109 of L-shaped members 106 abut against back bar 95 and lie under bar 96 thus forming movable bottoms for portions of the wire guiding channel.

The hook forming mechanism.

The hook forming mechanism (Figs. 15, 16, 17 and 18), comprises a stationary pin 110 secured to the guide bar 96 and extending vertically downward to the bed plate, a grooved roller 111 spaced from the pin and mounted on a stud secured to the bed plate and a roller 112. Roller 112 is mounted on a stud 113 secured to a swinging arm 114 carried on a block 115. Block 115 is provided with an upwardly projecting edge 116 and the swinging arm is yieldingly held in normal position against this projecting edge by means of a spring 117. The rear end of arm 114 is cut away as shown at 118 so as to allow a limited swinging movement to the arm at right angles to the line of travel of the wire into position in the machine.

A guide plate 119 having a curved guide surface 120 is secured to the bed in the path of travel of roller 112 while moving to hook forming position. Block 115 is pinned to a reciprocating rod 121 and the rod is prevented from turning by means of a guide rod 122 which lies between ears 123 which extend downwardly from block 115. Rod 121 carries a block 124 which is pinned thereto and between this block and part 125 of the frame of the machine, a coil spring 126 is located. This spring surrounds the rod and yieldingly urges the same toward one limit of its movement (Figs. 15 and 17).

The main shaft 32 carries a roller cam 127 for reciprocating rod 121. A lever arm 128 pivoted at 129 to the frame of the machine has its free end connected by means of a link 130 to block 124 on the reciprocating rod 121. The lever carries a roller 131 with which roller cam 127 is adapted to contact. The cam forces rod 121 against the stress of spring 126 and reciprocates the rod in one direction the spring moving the rod in the opposite direction.

Fig. 17 shows the wire W in position in the machine and before the hook former begins to operate. When rod 121 is moved by cam 127 into hook forming position (Fig. 18) the wire is bent against pin 110 and between it and grooved roller 111. The guiding surface 120 of guide plate 119 causes pivoted arm 114 to the position shown in Fig. 18 so that the wire is bent around the former roller 112 and to one side of the line of travel of support block 115, thus giving the proper contour to the hook. Suitable mechanism is preferably provided for holding the wire against movement during formation of the hook. As illustrated, this is accomplished by forming the cam face 78' of the cutter operating lever 78, see Fig. 6, so that the cutter 75 will be momentarily stopped after cutting part way through the wire in substantially the position shown in Fig. 8. After formation of the hook the movement of the cam 78' is continued so as to finish the cutting of the wire.

Body forming mechanism.

The body forming mechanism includes a pair of pivoted arms 132 (Figs. 1 and 20) which are supported to swing just above the bed plate and around vertically extending posts 133 secured to the bed adjacent the opposite ends of former plate 90. Surrounding each post 133 is a coil spring 134. The upper end of this spring is secured to a tensioning block 135 which is held in adjusted position by means of a locking pin 136. The lower end of each spring is bent as shown at 137 and the bent end lies on a hole formed in the top of the adjacent forming arm. The upper end of each spring is bent as shown at 138 and this bent end lies within a hole formed in the bottom of the tensioning block. By turning these blocks thereby stressing the springs and then locking the blocks in adjusted position, sufficient tension is put upon the springs to yieldingly hold the arms in inoperative position as shown in Fig. 1 and as shown by dotted lines in Fig. 20.

After the wire has been severed and the hook is formed, the forming arms are moved jto the position shown by full lines, Fig. 20 and the length of wire is bent into the general form of a hanger.

Each of the forming arms on its inner or operative face is provided with a channel 139 shown by dotted lines, Figs. 1 and 20. This channel is made of sufficient width so that when the arms are moved to the position shown in Fig. 20, the former plate 90 will lie within the channels. As the arms are swung to forming position (full lines Fig. 20) from inoperative position (dotted lines Fig. 20), the wire is caught by the channels in the ends of the forming arms at points 140 and carried into contact with the edges of the former plate and pressed into shape to form the body of the hanger.

A cam 141 (Fig. 19) keyed to the main shaft 32 of the machine forces the forming arms 132 into forming position through the agency of a cam lever 142, an adjustable link 143, a lever 144 and chains 145.

Lever 142 is pivotally mounted in a bracket 146 secured to the under side of the bed. This lever carries a roller 147 with which the cam 141 contacts. Lever 144 is pivotally mounted at 148 to the outer end of a bracket 149 the upper end of which is secured to the frame of the machine. The upper end of lever 144 by means of a pair of links 150 is connected to a block 151 which is mounted to slide on a horizontal rod 152, rigidly secured to the bed 153.

Each of the chains 145 is secured to block 151 at one end and to the outer or free end of one of the forming arms 132 at the other end, as shown at 154, Figs. 1 and 20.

A cushioning spring 155 is interposed between the inner end of sliding block 151 and the mounting member 156 for the horizontal rod 152. Idler sprockets 157 one for each chain, are mounted for rotation above the bed and in the plane of movement of the chain. These sprockets mesh with the chains and cause the chains to swing the forming arms inwardly from the position shown in Fig. 1 and by dotted lines Fig. 20 to forming position as shown by full lines, Fig 20.

A curved guiding track or way is provided for each side of the machine and each of these tracks is bolted to the bed. The track for the hooked end of the wire is numbered 158, while that for the straight end is numbered 159. The inner concave face of each track member is provided with a wire guiding slot or channel 160 within which its end of the wire moves while being bent around the former plate.

Twisting mechanism.

The twisting mechanism includes a twister head 161 which when in twisting position is located on the median line of the former plate 90. The twister head is mounted on a shaft 162 which carries a crown gear 163. Shaft 162 is journaled in bearings carried in a more or less rectangular frame 164.

The frame 164 is provided with oppositely extending trunnion-like members 165 and 166. Trunnion 165 is tubular. A shaft 167 which carries a crown gear 168 meshing with crown gear 163 is mounted for rotation within tubular member 165 and this shaft is journaled within a bearing 169 carried by a support bracket 170 bolted to the front of the bed. Trunnion-like member 166 is journaled within a bearing 171 which is also carried by support bracket 170. On this trunnion-like member 166 a gear 172 is keyed and secured to shaft 167 is a gear 173.

Gear 172 meshes with a rack 174 which is mounted for vertical reciprocation within a guide way 175. A rack 176 meshes with gear 173 and this rack is mounted for vertical reciprocation within guide way 177.

The outer end of trunnion-like member 166 is reduced in diameter as shown at 178 and pinned to the outer end thereof is an abutment member 179. This reduced portion also carries a sleeve-like member 180. A coil spring 181 having one end thereof secured to abutment member 179 and the other end secured to sleeve 180 surrounds the reduced portion of trunnion 166.

Spring 181 is stressed by rotating sleeve 180 and then by locking it to a stationary part of the machine such as the frame. This is done by means of a pin 182 which projects from the sleeve 180 and which is caused to abut against an adjacent portion of the frame or support bracket 170. The spring 181 is so stressed that it tends by rotation of gear 172, to force rack 174 downwardly to the lower limit of its travel.

An adjustable link 183 connects the lower end of rack 174 with the free end of a swinging lever 184. The other end of this lever is pivoted at 185 to a support pad 186 secured to the frame of the machine. This lever carries a cam contact roller 187 with which a cam 188 keyed to main shaft 32 contacts.

As rack 174 is moved downwardly, it will cause frame 164 with the twister head to swing or move from the position shown by full lines Fig. 29 (discharge position) to the position shown by dotted lines (twisting position) and when the rack moves upwardly, it will swing the frame 164 and therefore, the twister head from the dotted line position to the full line position. During these movements, crown gear 163 will roll around crown gear 168 as will be readily understood.

The lower end of rack 176, by means of an adjustable link 189, is connected to the free end 190 of a lever 191. The lever is pivoted to the frame of the machine at 192 and is operated by means of a cam 193 keyed to the main shaft 32 of the machine.

Shaft 167, which carries crown gear 168 and gear 173, has its outer end reduced as shown at 194 and this reduced portion is surrounded by a coil spring 195 similar to coil spring 178. One end of this spring is secured to an abutment member 196 which is pinned to the reduced portion of the shaft; the other end of the spring is secured to a sleeve 197 which is rotatable with regard to the shaft and is held in adjusted position by means of a projecting pin 198 which is adapted to abut against stop portion 199 of the frame. Spring 194 is so stressed that by rotating the gear 173 it yieldingly forces rack 176 to the upper limit of its travel.

*Twister head.*

The twister head proper is illustrated in detail in Figs. 21 to 27 inclusive. The main portion or body 200 thereof is provided with a socket 201 for receiving the twister head shaft 162 to which the head is pinned.

The head is slotted from side to side as shown at 202 (Figs. 23, 24 and 25) and the sides of the slots are chamfered as shown at 203. Slot 202 is longer on one side as shown at 204 than it is on the other as shown at 205. The intervening metal is curved as shown at 206 and provides a stop for the rear portion of the hook as the hook end of the wire is forced into the twister head preparatory to twisting (Fig. 20). The hooked end of the wire enters the slot through the long side while the straight end of the wire enters the slot through the short side.

The head is provided with a hardened lower jaw 207 having a cylindrical shank 207ª which is rigidly secured in position by means of a set screw 208. An upper jaw member 209 is provided with a cylindrical shank 210 which fits within a bore formed for that purpose in the body portion of the head. A pin 211 threaded into the cylindrical shank 210 projects through an elongated slot 212 formed in the body portion of the head.

An operating lever formed in the nature of a plate 213 is pivoted to the top of the body of the head by means of a shouldered screw 214. This lever has a slightly elongated hole 215 which embraces the pin 211 and through which the pin extends. The construction is such that as the lever is swung about its pivot, jaw member 209 will be rocked on its shank.

Jaw member 209 has its sides slotted as shown by dotted lines at 216, (Fig. 21) and a U-shaped gate member 217 adapted to slide within slots 216 is carried by jaw 209. The inner ends of the gate member are beveled as shown at 218, (Figs. 24 and 25) so that the gate will be lifted as the ends of the wire are forced to position between the jaws 207 and 209. The gate 217 is yieldingly held in wire locking or operative position by means of a coil spring 219 which surrounds a pin 220 loosely extending through a bore in the cross bar or upper portion 221 of the gate. Pin 220 is threaded into jaw member 209 and at its outer end carries an adjustment nut 222 for varying the tension of spring 219.

The threaded bore of jaw member 209 within which the inner end of pin 208 is secured extends through jaw member 209 but has its diameter reduced to accommodate a hardened pin 223. This pin is rigidly held in position by pin 220 which abuts against the inner enlarged end of the same.

Lever 213 is held in normal position by means of a spring 224. When this lever is in normal position, jaw member 209 will be in the position shown in Fig. 24.

The body of the twister head has its rear end reduced as shown at 225 and the surface of this reduced portion is formed as shown in Fig. 27 with a stop shoulder 226. A pawl 227 pivoted at 228 to frame 164 of the twisting mechanism (Fig. 29) is adapted at times to engage stop shoulder 226 to prevent rotation of the twister head.

A support bracket 229 bolted to the frame of the machine has its outer end drilled and tapped to receive a screw 230. The upper end of this screw is adapted to contact with end 231 of lever 213 when the twister head is moved to discharging position. The lever 213 by contacting with the outer end of this screw rocks the jaw 209 of the twister head to releasing position as shown in Fig. 25.

In Fig. 26, the free end of lever 213 is shown in contact with the upper end of actuating pin 230, in this position the lever by means of pin 211 has rocked the jaw 209 to release the hanger from the twister head.

*Hanger discharge and collecting mechanism.*

This mechanism is shown in Figs. 1, 28, 29, and 30. A rod 232 secured to support bracket 170 extends forwardly of the machine and adjacent its outer end carries an upright support member 233. A plate 234 provided with an elongated slot 235 for securing vertical adjustment, is bolted to this upright support member. A lever arm 236 pivoted to plate 234 at 237 is yieldingly held in normal position against a stop 238 by means of a spring 239. That portion of the lever which projects beyond the plate serves as a knock-out agent and assists the hangers in leaving the gate and the space between jaws 207, and 209. This action is graphically illustrated in Fig. 26. The gate opens as jaw 209 is rocked on its shank since one beveled end of the gate contacts with jaw 207.

Located in the path of the hangers leaving the twister head is a member 240. This member is pivoted to the plate at 241 and is held in normal position by means of a spring 242. The upper surface of member 240 is inclined as shown in Figs. 28 and 30 and as the hangers fall to the position shown by dotted lines in Fig. 26, the inner surface of the hook contacts with the top of member 240 and the hangers slide down this member and onto a collecting bar 243 down which they slide to the point of removal.

Rod 232 carries a horizontally disposed rod 244 which serves as a stop to prevent the hangers from unhooking from member 240 as they tilt from full line position to dotted line position shown in Fig. 26.

*Operation.*

In starting up the machine the end of the wire from the coil is fed through the pinch rolls through the straightening rolls and into cutter block 23. When the wire propelled by the pinch rolls, reaches the opposite end of the machine from said rolls, it contacts with the abutment or stop member 84 and lever 61 is thereby moved out of contact with the end of lever 64 and the feed of the wire by the pinch rolls is stopped. Cam 62 which operates lever 61 is so timed that the feed of the wire should stop at this time but the precaution is taken of positively stopping the pinch rolls as soon as the wire reaches its position in the machine.

Immediately after the wire reaches its position cam 127 reciprocates the hook forming roller 112 and the wire is bent around the roller and between stop pin 110 and grooved roller 111. During formation of the hook, cam 82 reciprocates cutter 75 and severs the length of wire.

As soon as the wire has been severed and the hook formed, cam 105 raises the guiding bar 96 to release the wire and cam 141 causes the former arms to swing and force the wire around former plate 90 and into the twister head where it is automatically locked in position by sliding gate 217.

Cam 141 is so shaped that the former arms 132 will hold the wire in contact with former plate 90 during the twisting operation which is immediately caused to take place by means of cam 193. As soon as the twist has been made, cam 188 causes the twister head to swing about the axis of crown gear 168 from twisting position to discharge position. The cam 193 is formed so that as soon as the twist has been made the twister head will begin to rotate in the opposite direction from the twisting movement and during the swinging of the twister head from twisting to discharging position. Just prior to the time the twister head reaches discharging position, pawl 226 by contacting with the bed of the machine will lock the twister head against further rotation in the direction in which it has been rotating. This is adjusted so that the plane of the hanger to be discharged will be perpendicular.

As the twister head approaches discharging position, lever 213 upon contacting with the other end of actuator screw 230 will rock jaw 209 and gate 217 will thereby be forced into open position by its lower beveled edge 218 and the finished hanger will pass below detent 240 which serves as a gate, will then contact with knock-out lever 236 and will then fall to the position illustrated by dotted lines in Fig. 26. The released hanger will then slide down the bar to the point where it is to be removed for packing.

As soon as the twisting operation has been completed the former arms will be forced back to initial position by means of springs 133. When they reach this position, guide bar 96 will be allowed to drop to guiding position and the pinch rolls will force another length of wire into position in the machine and a new cycle of operation will be started.

Having thus described my invention, what I claim as new and useful and desire to secure by Letters Patent is:—

1. In a machine for making wire garment hangers, means for feeding wire into the machine, simultaneously operating means for forming a hook on one end of the wire and severing the other end, a twister, means for bending the wire into the general form of a hanger and for forcing the ends thereof into said twister, means for rotating said twister to form a twist on the ends of the wire below the hook, hanger receiving means and means for swinging said twister from twisting position to discharging position and for discharging hangers onto said receiving means.

2. In a machine for making wire garment hangers, intermittently operating rolls for feeding wire intermittently and at regular intervals into position in the machine, wire straightening means located at the outlet side of said wire feeding rolls, a wire cutter located at the outlet side of said wire straightening means, a hook former, means for operating said hook former during the operation of said cutting means, a wire twister, means for bending the hooked wire into the general form of a hanger and for carrying the ends thereof into said twister, and means for operating said twister.

3. In a machine for making wire garment hangers, intermittently operating rolls for feeding wire intermittently and at regular intervals into position in the machine, wire straightening means located at the outlet side of said wire feeding rolls, a wire cutter located at the outlet side of said wire straightening means, a hook former, means for operating said hook former during the operation of said cutting means a wire twister, means for bending the hooked wire into the general form of a hanger and for carrying the ends thereof into said twister, and means for operating said twister and for moving the same to and from discharging position.

4. In a machine for making wire garment hangers, intermittently operating rolls for feeding wire intermittently and at regular intervals into position in the machine, wire straightening means located at the outlet side of said wire feeding rolls, a wire cutter located at the outlet side of said wire straightening means, a hook former, means for operating said hook former during the operation of said cutting means, a wire twister, means for bending the hooked wire into the general form of a hanger and for carrying the ends thereof into said twister, means for locking the wire in said twister, means for operating said twister and means for releasing the finished hanger from said twister.

5. In a machine for making wire garment hangers, a pair of pivoted arms for bending a length of wire into the general form of a hanger, means for forming a hook on one end of the wire prior to the operation of said arms positioned to receive the wire as it is fed to position relative to said bending arms, a twister positioned to receive the hooked end of the wire and the other end of the wire upon the operation of said arms, a wire straightener, a wire cutter located between said straightener and said arms and means for intermittently feeding a length of wire through said wire straightener and said cutter and into operative relation to said bending arms and hook forming means.

6. In a machine for making wire garment hangers, continuously operating rolls for feeding wire into position in the machine, means for forming a hook on one end of said wire, means operating during the formation of the hook for cutting the other end of the wire, means for bending the wire to form the body of a hanger, means for forming a twist between the hook and body, means tending to separate said feed rolls and a cam for at intervals causing said rolls to feed.

7. In a machine for making wire garment hangers, rolls for feeding wire into position in the machine, means for forming a hook on one end of said wire, means operating during the formation of the hook for cutting the other end of the wire, means for bending the wire into the general form of a hanger, means for forming the twist, means tending to hold one of said feed rolls in inoperative position, a cam for regularly moving said roll into operative position and means operating independently of said cam for releasing said feed roll and allowing it to be moved to inoperative position.

8. In a machine for making wire garment hangers, a stationary former plate, arms for bending a length of wire around said plate, a twister located at the median line of said plate and into which said arms are adapted to force the ends of the wire and means including two lengths of chain connected to the swinging ends of said arms for moving said arms during the bending of the wire.

9. In a machine for making wire garment hangers, a stationary former plate, arms for bending a length of wire around said plate, a twister located at the median line of said plate and into which said arms are adapted to force the ends of the wire, means including two lengths of chain for moving said arms during the bending of the wire and means for discharging finished hangers from the twister.

10. In a machine for making wire garment hangers, hook forming, bending and twisting mechanisms, a wire cutter, means for operating said wire cutter and the hook forming mechanism simultaneously, a wire straightener and means for intermittently feeding wire through said straightener past said cutter and into operative relation to said hook forming and bending means.

11. In a machine for making wire garment hangers, hook forming, bending and twisting mechanisms, a wire cutter, means for operating said wire cutter and the hook forming mechanism simultaneously, a wire straightener, continuously operating pinch rolls, means for intermittently moving one of said rolls into operative position in contact with the wire to intermittently feed the wire from a coil of wire into operative relation to said hook forming and bending mechanism, means for releasing the movable pinch roll and means for moving the same to inoperative position when released.

12. In a machine for making wire garment hangers, a stationary former, feed rolls for forcing wire into the machine and past the former, hook forming mechanism, a cutter for severing the wire, a wire straightening device located between said feed rolls and said cutter, means for bending the wire around said former and means for twisting the ends of the wire together after the same has been bent to form.

13. In a machine for making wire garment hangers, a stationary former, forming arms pivotally mounted adjacent the opposite ends of said former, an operating cam, a lever arm adapted to be operated by said cam and flexible means connecting the free ends of said former arms to said lever arm.

14. In a machine for making wire garment hangers, means for bending a length of wire into the general form of a hanger, means for forming a hook on one end of the wire, a twister for twisting the ends of the wire together, means for swinging the twister from twisting position to discharge position, hanger receiving means, means for releasing the hanger from the twister and means for conveying the hanger discharged from the twister to the hanger receiving means.

15. In a machine for making wire coat hangers, a bed plate, a wire guide movable toward and from said bed plate, a hook former adjacent one end of said guide, a wire cutter adjacent the other end of said guide, a forming block located on one side of said guide, pivotally mounted forming arms located, when in inoperative position on the opposite side of said guide from said former block, a wire twister having its axis of rotation along the median line of the former block, means for rotating said wire twister in opposite directions, means for swinging said twister into and out of operative position, straightening rolls and means for periodically and at regular intervals forcing wire through said straightening rolls and into operative relation to said hook former and forming block.

16. In a machine for making wire garment hangers, means for forming a hook on one end of a length of wire, a stationary former block, pivoted forming arms for forcing the hooked wire around said former block, a twister head into which the ends of said wire are adapted to be forced by said forming arms and guide-ways for directing the ends of said wire into said twister head.

17. In a machine for making wire garment hangers, a hook former comprising co-operating elements located on opposite sides of the line of travel of the wire into the machine, a wire cutter having co-operating elements located on opposite sides of said line of travel of the wire, a former plate, a pair of pivoted former arms which when in inoperative position lie on the opposite side of said line of travel from said former plate, a wire guide movable into and out of operative position between said former arms and said plate, a wire twister disposed for rotation on the median line of the former plate and at right angles to the travel of the wire into the machine, means for moving said former arms to bend a length of wire around said former plate and to force the same into said twister, means for rotating said twister, means for swinging said twister toward and from twisting position, a wire straightener and means for intermittently forcing wire through said straightener and into operative relation to said hook former and former plate.

18. In a machine for making wire garment hangers, the combination of means for bending a length of wire to form the body of a hanger, means for forming a hook on one end of said wire, positioned to receive the wire as it is fed to said bending means, means for twisting the ends of the wire, in which such ends are positioned by said forming means, an intermittently-operating feed means delivering the wire to said bending means, and a wire cutter acting to sever the wire after it has been delivered to said bending means.

In testimony whereof, I have hereunto subscribed my name this 22nd day of July, 1926.

FRANK MAGIDSON.